Jan. 6, 1931.  W. A. RIDDELL  1,787,797
PHOTOGRAPHIC SHUTTER CONSTRUCTION
Filed Dec. 17, 1928
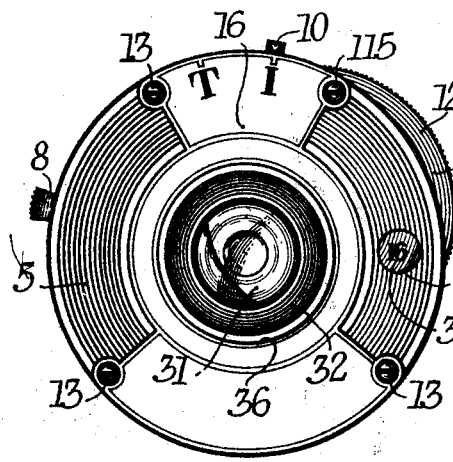
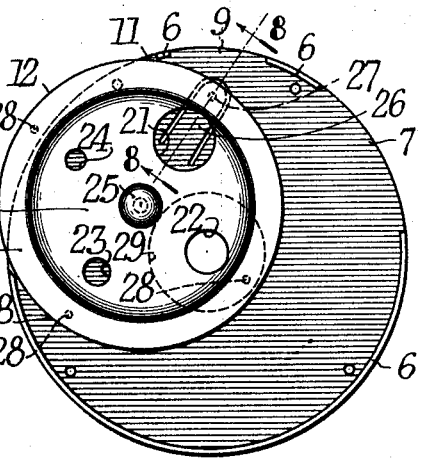
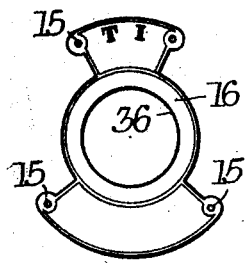
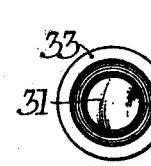
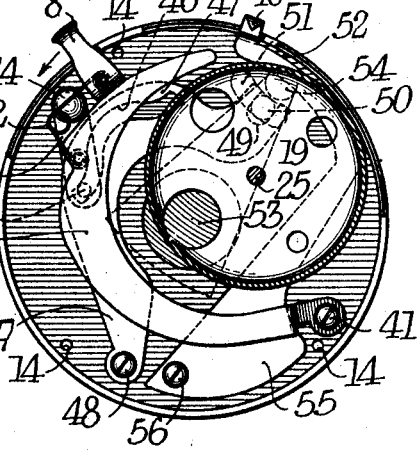
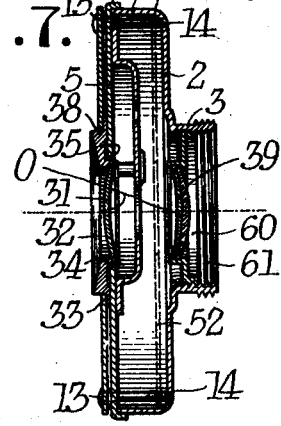
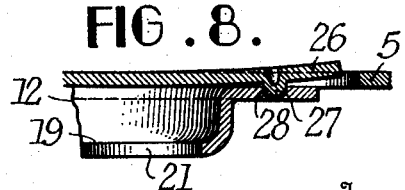
Inventor,
William A. Riddell,
By Newton N. Perrios,
Donald H. Stewart,
Attorneys Patented Jan. 6, 1931

1,787,797

UNITED STATES PATENT OFFICE

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK

PHOTOGRAPHIC-SHUTTER CONSTRUCTION

Application filed December 17, 1928. Serial No. 326,455.

This invention relates to photography and more particularly photographic shutters.

One object of my invention is to provide a simple, inexpensive shutter having a diaphragm of simple construction. Another object of my invention is to provide a shutter with a disc type of diaphragm so arranged that the apertures will be in the proper position relative to the lens elements and so that the diaphragm disc may make a substantially light-tight connection with parts of the shutter. Another object of my invention is to provide a shutter which is attractive in appearance. Another object of my invention is to provide a shutter cover plate designed to obscure unsightly parts of the shutter. Another object of my invention is to provide as a unitary construction, a shutter cover plate, lens mount and diaphragm. Still another object of my invention is to provide a simple means for mounting a front lens element of an objective, and other objects will appear from the following specification, the novel features being particularly pointed out in the claims at the end thereof.

This shutter is of the same general type as that shown in my patent for photographic shutter, Patent No. 1,701,121, issued February 5, 1929. Substantially the same shutter plate operating mechanism is used in this shutter, so that for a detailed description of these parts, reference may be had to my above mentioned patent.

Coming now to the drawings wherein like reference characters denote like parts throughout:

Fig. 1 is a front elevation of a shutter constructed in accordance with and embodying a preferred form of my invention.

Fig. 2 is a rear elevation of the shutter cover removed from a casing showing the diaphragm mounting and latching mechanism.

Fig. 3 is a front plan view of an etched plate used with a preferred form of shutter cover.

Fig. 4 is a top plan view, partially in section, of a shutter with a shutter cover removed showing the plate operating mechanism in its relation to the diaphragm.

Fig. 5 is a front plan view of a front lens element and cell.

Fig. 6 is a rear plan view of the front lens element and cell.

Fig. 7 is a cross section through the shutter shown in Fig. 1, parts being omitted for the sake of clearness.

Fig. 8 is an enlarged fragmentary detail on the line 8—8 of Fig. 2.

In the photographic shutter shown in my patent above referred to, no provision is made for providing an objective having front and rear lens elements. Where such a lens is used, these elements must be axially aligned accurately to produce satisfactory results and a diaphragm should bear a definite relation to the position of the lens elements. This invention is directed to providing a suitable structure for such a lens without materially increasing the cost of the shutter, so that it will be suitable for inexpensive cameras.

In the present invention, the shutter may consist of a cup-shaped casing designated broadly as 1 having a bottom wall 2 surrounding the rearwardly extending lens tube 3 and a flange 4 forming the peripheral wall of the casing. On the open front of the casing thus formed, a cover plate 5 may be located by means of a downwardly extending flange 6 on the shutter cover, this flange being interrupted at 7 for the shutter trigger 8, at 9 for the time and bulb lever 10, and at 11 for the diaphragm disc 12.

The shutter cover may be held in place by means of three screws 13 which pass down into threaded apertures 14 in the rear wall 2 of the shutter casing. In addition to holding the shutter cover in place, the three screws 13 pass through apertures 15 of an etched plate 16 which forms a decorative covering for a portion of the shutter cover. A fourth screw 115 is employed to assist in holding the etched plate in position, but this screw does not pass down to the bottom of the shutter casing, since the diaphragm plate 12 lies between it and wall 2.

The shutter cover 5, etched plate 16 and diaphragm plate 12, may be removed as a unit, since the screw 115 may hold the etched plate to the shutter cover when the screws 13 have been removed.

As best shown in Fig. 2, the diaphragm plate consists of a disc 12 having a flange 17 which normally lies in contact with the flat rear surface 18 of the shutter cover plate 5. The central portion of disc 17 is formed downwardly at 19 into a cup-shaped member, there being a plurality of different sized diaphragm apertures 21, 22, 23 and 24 cut in the bottom of the cup-shaped member. The disc is mounted off to one side of the center of the shutter plate 5 and is supported by a stud 25, which passes through the bottom 19 of the diaphragm disc and is riveted on to the shutter cover 7. The position of this rivet does not show from the front of the shutter, as indicated in Fig. 1, since it lies beneath the etched plate 16.

Referring to Figs. 2 and 8, the shutter cover 7 is provided with a struck-out spring finger 26 which is provided with a protuberance 27. Opposite each one of the apertures 21, 22, 23 and 24, there is provided a depression 28. The depression and the protuberance 28 and 27 form a snap latch tending to hold the diaphragm disc 19 in a set position with a diaphragm aperture axially aligned with the objective. It should be noted that this spring finger 26 is also positioned to lie beneath a portion of the etched plate 16, so that it does not in any way mar the looks of the shutter.

The shutter cover 5 is provided with an aperture 29 through which numerals 30 may be seen, these numerals indicating the particular diaphragm in position for use. These numerals are placed upon the inside wall of the cup-shaped diaphragm member 19 which may be conveniently made from an etched plate.

In addition to obscuring unsightly parts of the shutter cover, the etched plate 16 performs another function, that of supporting the front lens element of the objective in the proper position. As indicated in Figs. 5 and 6, the front lens element 31 may be carried in the cell 32 which is provided with an outwardly extending flange 33 and which is provided with a downwardly extending flange 34, this latter flange being spun over against the inside of the lens element 31. This is best shown in Fig. 7.

The central portion of the shutter cover plate 5 is provided with a central aperture 35, this aperture being of such a size that the flange 34, which extends to the rear of the lens cell 31, will snugly fit in the aperture. This fit is made sufficiently close to locate the lens 31 with respect to the shutter.

In order to hold the lens cell 31 in place, the etched plate 16 is provided with a central aperture 36 which is adapted to lie over the downwardly extending flange 33 of the lens cell and engage the wall 38 thereof. As the screws 13 are screwed down into the shutter casing, the etched plate will draw down upon the flange 33 holding the front lens element 31 firmly in place.

In Fig. 7 I have shown the objective designated broadly as O as consisting of a front lens element 31 and a rear lens element 39, this being shown as consisting of two cemented lens elements. This particular lens may be a modification of the well known periscopic type, but since the objective itself forms no part of my present invention, it will not be herein more fully described.

It has heretofore been difficult to put a disc type diaphragm in a shutter in which there are a number of moving parts, because such a diaphragm must be placed in a definite location with respect to the lens elements and must at the same time avoid the mechanism of the shutter. From Fig. 4, it will be seen that the cup-shaped portion 19 of the diaphragm disc 12 extends down into the shutter casing 1, so that the diaphragm openings will be in the desired position with respect to the lens elements 31 and 39 and yet is arranged to lie out of the path of the shutter-moving parts and also to form a substantially light-tight connection with the shutter cover 5 as was above described.

While the parts are substantially the same as those shown in my patent above referred to, the principal parts will be referred to to indicate their relation to the diaphragm structure and to the lens cell mount which have been hereinbefore described.

The shutter trigger 8 forms a part of a curved lever 40 pivoted at 41 to the rear wall 2 of the shutter casing. Lever 8 is connected by hairpin spring 42 to a link 43 which may be oscillated back and forth about the pivot 44 to cause a stud 45 to pass through a cam slot 46 in a master member 47.

Master member 47 is pivoted at 48 to the shutter casing and has a yoke 49 embracing the sides of a stud 50 passing up through an arcuate slot 51 in the partition plate 52. Stud 50 is carried by a shutter blade 53 which is pivoted at 54 to the bottom wall 2 of the shutter casing. By moving the trigger 8 from the position shown in full lines (Fig. 4) in the direction of the arrow, the shutter blade is made to cover and uncover the exposure aperture. The trigger may then be removed in a reverse direction for a second operation. By moving the control lever 10 from the position in Fig. 1 opposite I, which stands for instantaneous exposures, to a position opposite T which indicates time exposures, the lever 55 will be moved about a pivot 56, thus bringing a lug, now shown in the drawings, in the path of the shutter blade to hold it in an open position.

With the shutter parts constructed as above described, the assembling operation of the shutter is greatly facilitated. The shutter cover 5 may be equipped with the diaphragm 12, lens element 31 and etched plate 16, by entering screw 115 into the threaded aperture in the shutter cover 5. When the shutter casing 1 has been provided with the necessary parts for operating the shutter blade, it is only necessary to place the three screws 13 into the threaded apertures 14 of the shutter casing to fasten the parts together. The rear lens element 39 may be placed in a threaded cell 60 so that the objective can be properly adjusted by moving this cell in its thread 61, this operation completing the assembly of the shutter and objective.

Having thus described my invention, what I claim as new and desire to secure by Letters Patent is:

1. In a shutter for photographic cameras, the combination with a casing adapted to contain shutter blades and operating mechanism therefor, of a cover plate, a cup-shaped diaphragm pivotally mounted on the cover plate, said diaphragm having a plurality of apertures thereon, a spring arm carried by the cover plate, and a protuberance and depression snap latch between the spring arm and the periphery of the cup-shaped diaphragm adapted to hold the latter in a predetermined position.

2. In a shutter for photographic cameras, the combination with a casing adapted to contain shutter blades and operating mechanism therefor, of a cover plate, a cup-shaped diaphragm pivotally mounted on the cover plate, the rim of said diaphragm contacting with said cover plate and the cup-shaped portion thereof being spaced from the cover plate and having apertures therein, with a small depression spaced from each aperture, a protuberance on the cover plate adapted to snap into any one of the depressions whereby the apertures may be positioned relative to the cover plate.

3. In a shutter for photographic cameras, the combination with a casing adapted to contain shutter blades and operating mechanism therefor, of a cover plate, a cup-shaped diaphragm pivotally mounted on the cover plate, said diaphragm including a flange adapted to contact with said cover plate and a plurality of apertures in the cup-shaped portion spaced from the cover plate and extending into the shutter casing, a stud on which the diaphragm plate is pivotally mounted, said stud being positioned to permit the flange of the diaphragm to project from the shutter casing, the cup-shaped portion lying entirely within the shutter casing.

4. In a shutter for cameras, the combination with a casing including a cup-shaped casing adapted to contain shutter mechanism therein, of a cover plate, a stud mounted on the cover plate and carrying a diaphragm disc, said disc having a plurality of apertures therein, said disc also comprising a cup-shaped member, a portion of which extends into the cup-shaped shutter casing and parts thereof and is so located with respect to the shutter casing that space remains in the shutter casing for the shutter mechanism.

5. In a shutter for photographic cameras, the combination with a cup-shaped shutter casing adapted to contain shutter-operating mechanism, of a cover for the shutter casing, and a diaphragm for the shutter supported solely by the cover.

6. In a shutter for photographic cameras, the combination with a cup-shaped shutter casing adapted to contain shutter-operating mechanism, and having a slotted wall, of a cover for the casing, a disc type diaphragm carried by the said cover and projecting through said slotted wall of the shutter casing.

7. In a shutter for photographic cameras, the combination with a cup-shaped shutter casing adapted to contain shutter-operating mechanism and having a slotted wall, of a cover for the casing, a disc type diaphragm carried by the said cover and having a downwardly-extending offset portion with diaphragm apertures therein extending into said cup-shaped casing, and a diaphragm-supporting member carried by said cover.

8. In a photographic shutter for cameras, the combination with a shutter casing, of a cover plate for the shutter casing, a diaphragm disc, a stud carried by said cover plate, said diaphragm disc being mounted on said stud, a snap connection between the diaphragm disc and said cover plate including a spring finger struck from said cover plate, and means carried by said cover plate for obscuring the stud and spring finger.

9. In a shutter for cameras, the combination with a casing including a cup shaped casing adapted to contain shutter mechanism and said casing having an opening therein, of a cover plate, a stud mounted on the cover plate and carrying a diaphragm disc, said diaphragm disc projecting out through said opening.

Signed at Rochester, New York, this 12th day of December, 1928.

WILLIAM A. RIDDELL.